(12) United States Patent
Wheatley

(10) Patent No.: US 6,799,927 B2
(45) Date of Patent: Oct. 5, 2004

(54) TIE DOWN ANCHOR SYSTEM

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 10/215,749

(22) Filed: Aug. 9, 2002

(65) Prior Publication Data

US 2004/0028497 A1 Feb. 12, 2004

(51) Int. Cl.$^7$ ............................................... B61D 45/00
(52) U.S. Cl. ........................................ 410/104; 410/105
(58) Field of Search ..................... 410/97, 104, 105, 410/118, 143, 144, 145, 150

(56) References Cited

U.S. PATENT DOCUMENTS

| | | | |
|---|---|---|---|
| 2,891,490 A | * | 6/1959 | Elsner |
| 3,405,660 A | * | 10/1968 | Jantzen |
| 3,850,113 A | * | 11/1974 | Sichak ........................ 105/482 |
| 3,958,516 A | * | 5/1976 | Cheung ....................... 105/478 |
| 4,033,268 A | | 7/1977 | Klekar |
| 4,083,312 A | * | 4/1978 | Holman, Jr. ................. 105/469 |
| 4,464,089 A | * | 8/1984 | Allen .......................... 410/97 |
| 4,484,847 A | * | 11/1984 | Holmes ...................... 410/104 |
| 4,702,653 A | * | 10/1987 | Gaulding et al. ........... 410/144 |
| 4,955,771 A | * | 9/1990 | Bott ........................... 410/94 |
| 5,265,993 A | * | 11/1993 | Wayne ....................... 410/129 |
| 5,302,064 A | | 4/1994 | Davis |
| 5,320,464 A | * | 6/1994 | Long et al. ................. 410/144 |
| 5,338,137 A | * | 8/1994 | Jensen ........................ 410/146 |
| 5,427,487 A | * | 6/1995 | Brosfske ..................... 410/121 |
| 5,445,482 A | | 8/1995 | Davis |
| 5,516,245 A | | 5/1996 | Cassidy |
| 5,752,791 A | | 5/1998 | Ehrlich |
| 5,807,047 A | * | 9/1998 | Cox ........................... 410/152 |
| 5,934,849 A | | 8/1999 | Haire |
| 6,024,402 A | | 2/2000 | Wheatley |
| 6,068,433 A | | 5/2000 | Baloga |
| 6,106,205 A | | 8/2000 | Haire |
| 6,146,069 A | | 11/2000 | Elwell et al. |
| 6,244,646 B1 | | 6/2001 | Wheeler, III |
| 6,256,844 B1 | | 7/2001 | Wheatley |
| 6,350,089 B1 | | 2/2002 | Tekavec |
| 6,409,063 B1 | * | 6/2002 | Kmita et al. ................. 410/105 |
| 2002/0048495 A1 | * | 4/2002 | Anderson et al. ........... 410/104 |
| 2003/0053879 A1 | * | 3/2003 | Delay ......................... 410/104 |

* cited by examiner

Primary Examiner—D. Glenn Dayoan
Assistant Examiner—H. Gutman
(74) Attorney, Agent, or Firm—Harness, Dickey & Pierce, P.L.C.

(57) ABSTRACT

A tie down anchor system for a pickup truck includes a rail member mountable to the cargo bed of the pickup truck. The rail member includes a pair of raised attachment sections and a base mounting portion extending between the pair of raised attachment sections. A plurality of first attachment apertures are formed in the pair of raised attachment sections and a plurality of second attachment apertures are formed in the pair of raised attachment sections so as to receive any one of a number of tether connectors.

46 Claims, 10 Drawing Sheets

TIE DOWN ANCHOR SYSTEM

FIELD OF THE INVENTION

The present invention generally relates to tie down anchor systems and, more particularly, relates to a tie down anchor system that may be mounted to the sidewalls, siderails, tailgate, or floor of a pickup truck bed.

BACKGROUND OF THE INVENTION

As is well known, one of the many advantages of owning a pickup truck is the ability to carry loads within the truck bed or cargo box. Typically, pickup trucks are manufactured and sold without means by which to secure or restrain a load in the truck bed. Since original equipment providers have opted not to provide such means, after market suppliers have devised various devices that allow for the securing and restraint of loads being carried in the cargo bed of the pickup truck. Ropes, straps, bungee cords, or other tether means are primarily used to secure these loads.

One type of commercially available tie down anchor is the stake pocket tie down anchor. Stake pocket tie down anchors mount into a stake pocket located in the top portion of the siderail of the pickup truck bed. One disadvantage of stake pocket tie down anchors is that they can only be used where a stake pocket is located. Many of the smaller trucks currently available are produced without stake pockets and, therefore, such stake pocket tie down anchors are not adaptable to these trucks.

Other tie down anchors are also available. One such type is designed to clamp to the siderail, generally at any desired point therealong. Such tie down anchors often utilize eyebolts and hooks in conjunction with a generally C-shaped clamping member to provide an anchor point for the tie down.

Another type of tie down anchor employs a generally C-shaped extrusion that is adapted to slidably receive a tie down therein. This type of tie down anchor is popular in aircraft, boats, and is occassionally employed in trucks.

One of many disadvantages of the above styles of tie down anchors, which either mount within the stake pocket or otherwise clamp to the siderail, is the manner in which the load is transferred to the siderail. By mounting the tie down anchor into the stake pocket, the anchor or loop of the stake pocket tie down anchor is positioned directly above the stake pocket and above the siderail. When the load is secured to the stake pocket tie down anchor by a tie down, a significant bending load is applied to the siderail. This bending load is such that applied forces tend to roll the siderail into the truck bed. Similarly, the clamp-on variety of tie down anchors have been constructed such that the anchor is positioned above the top portion of the siderail, in a manner very similar to a stake pocket tie down, or in a position inside the pickup truck bed on a flange extending downwardly from the top portion of the siderail. When mounted down on this flange, a tie down secured to the anchor also imparts a significant bending load to the siderail. Moreover, it is often preferable to have the tie down located at a lower position.

Moreover, the above style of tie down anchors further limits the method of connection with tether connectors. That is, often only a single type of tether connector may be used with a given tie down anchor system. Therefore, if one chooses to haul a light-weight cargo, they may chose a simple bungee cord type connector to couple the tether to the tie down anchor. However, if a heavyweight cargo is to be hauled, many tie down anchor systems are unable to accommodate a more robust connector, such as a retaining rod or oversized hook. In some cases, tie down anchors may only be used with custom tether connectors.

Additionally, due to the size of the cargo to be hauled, it is often necessary to have suitable tie down anchors along the floor of the pickup bed or, alternatively, along the siderails of the pickup bed. If a pickup is only equipped with tie down anchors along a narrow section of the floor of the pickup bed, then the securing of oversized cargo may prove to be difficult as the cargo itself may obscure the preferred tie down locations, and vice versa.

Accordingly, there exists a need in the relevant art to provide a tie down anchor system for a pickup truck that is capable of eliminating or minimizing bending loads applied to the siderail of the pickup bed. Furthermore, there exists a need in the relevant art to provide a tie down anchor system that is capable of providing a robust connection to either a siderail, sidewall, and/or floor of a pickup bed. Still further, there exists a need in the relevant art to provide a tie down anchor system that is capable of accommodating a number of different tether connectors. Additionally, there exists a need in the relevant art to provide a tie down anchor system that is capable of overcoming the disadvantages of the prior art.

SUMMARY OF THE INVENTION

According to the principles of the present invention, a tie down anchor system for a pickup truck having an advantageous construction is provided. The tie down anchor system includes a rail member mountable to the cargo bed of the pickup truck. These rails may be mounted in either a transverse or longitudinal direction using fasteners or other fastening means. The rail member includes a pair of raised attachment sections and a base mounting portion extending between the pair of raised attachment sections. A plurality of first attachment apertures are formed in the pair of raised attachment sections and a plurality of second attachment apertures are formed in the pair of raised attachment sections so as to receive any one of a number of tether connectors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
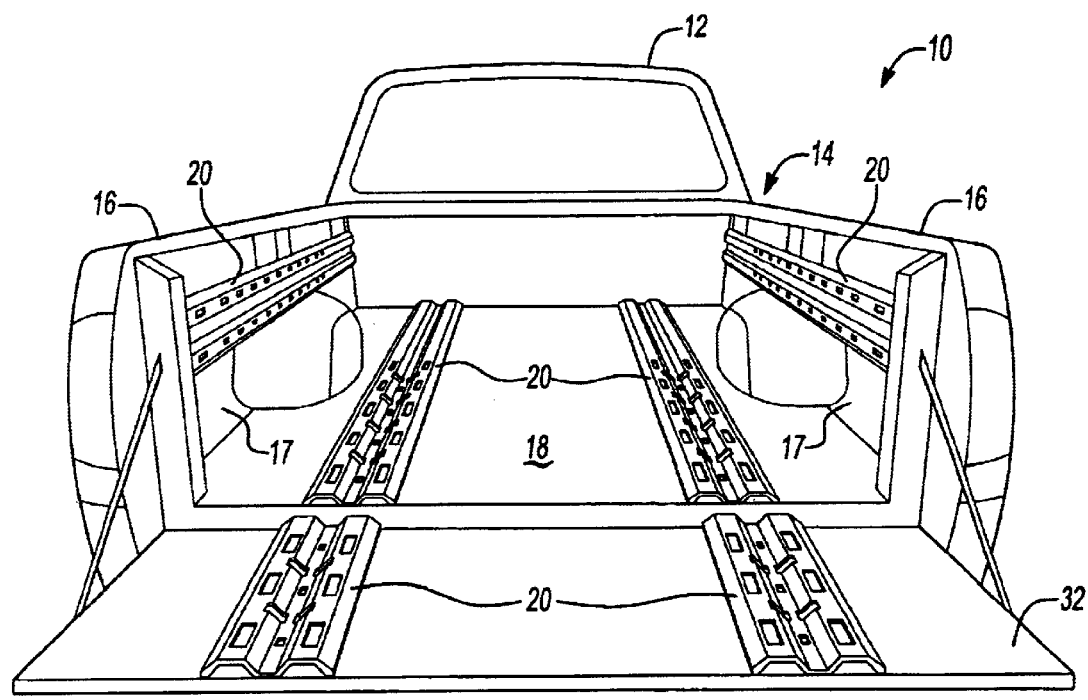
FIG. 1 is a perspective view illustrating a tie down anchor system according to the principles of the present invention incorporated in a cargo bed of a pickup truck in a longitudinal direction.

The following description of the preferred embodiments is merely exemplary in nature and is in no way intended to limit the invention, its application, or uses.

Referring now to the drawings, a tie down anchor system 10 is illustrated in accordance with the principles of the present invention. Specifically, tie down anchor system 10 is illustrated being installed in a pickup truck 12. Pickup truck 12 generally includes a cargo bed 14 having spaced apart opposing siderails 16 and a bed floor 18.

Figure 2:
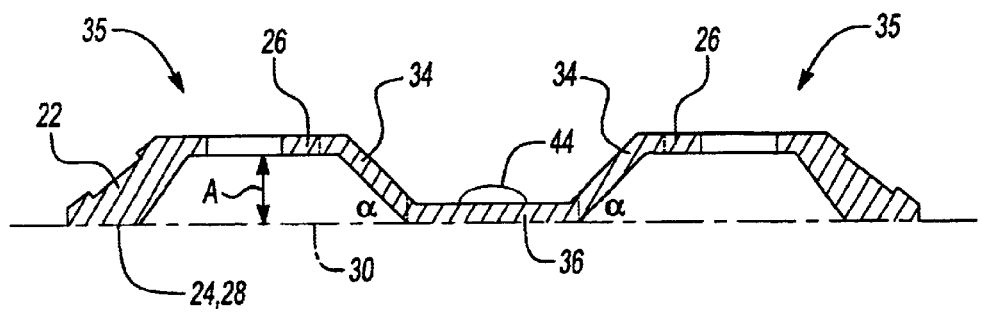
FIG. 2 is a cross-sectional view illustrating a rail member of the tie down anchor system.
Figure 3:
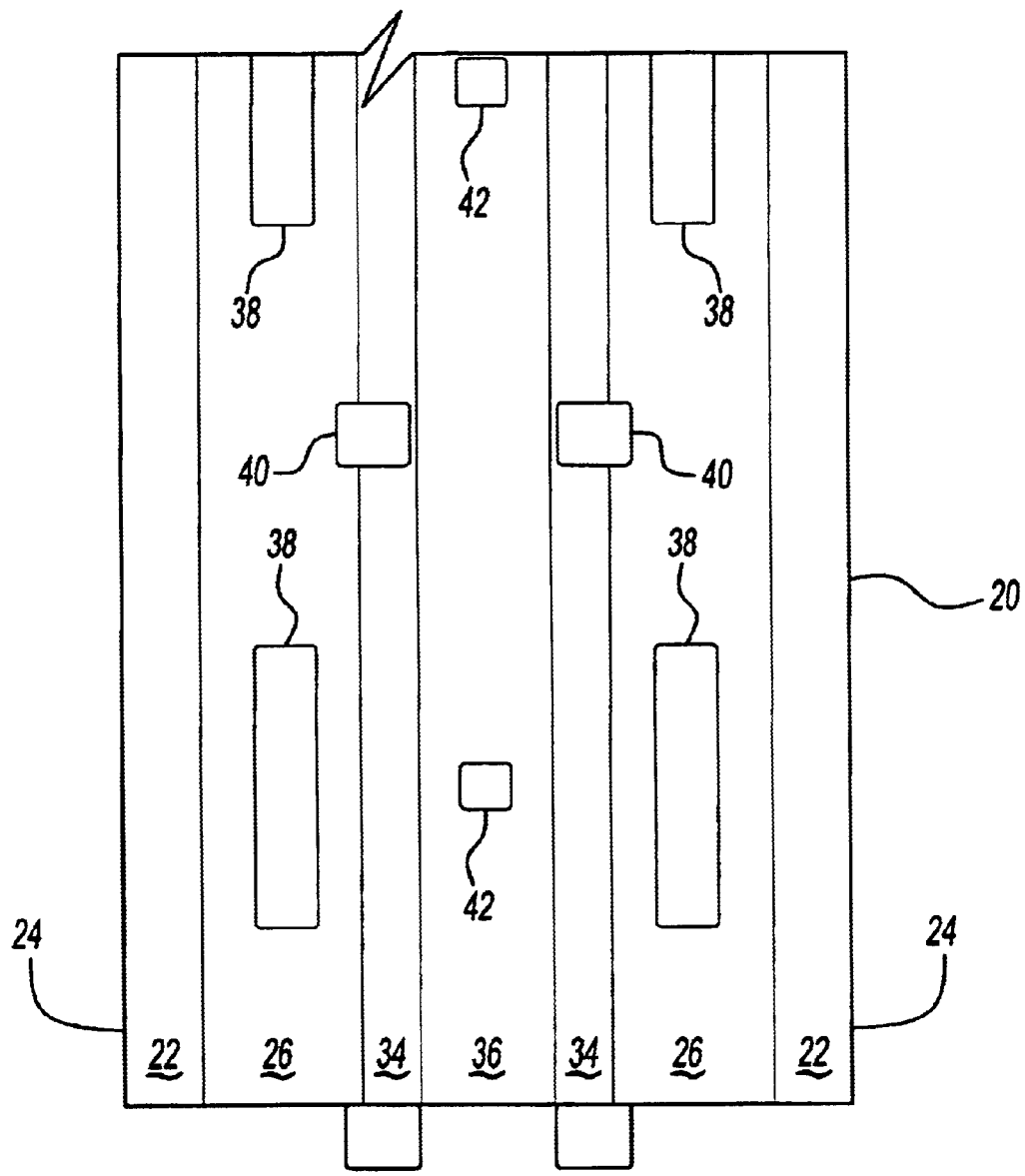
FIG. 3 is a plan view illustrating the rail member of the tie down anchor system.

According to the present embodiment of the invention, tie down anchor system 10 generally includes a plurality of rail members 20. As best seen in FIGS. 2 and 3, each of the plurality of rail members 20 generally defines an M-shape when viewed in cross-section. More particularly, each of the plurality of rail members 20 generally includes a pair of outboard inclined portions 22 extending inwardly from an enlarged foot portion 24 and terminating at a pair of raised attachment portions 26. Each foot portion 24 defines a generally flat section 28 that is adapted to generally rest upon and engages a mounting surface, generally indicated in phantom at 30. Mounting surface 30 is used, for discussion purposes, generally to represent siderails 16, side walls 17, bed floor 18, or a tailgate portion 32 of pickup truck 12. It should be noted, however, that any one of mounting surface 30 could be covered by a bed liner or other protective add on such that the plurality of rail members 20 is attached through the bed liner to further hold the bed liner in place.

Figure 11:
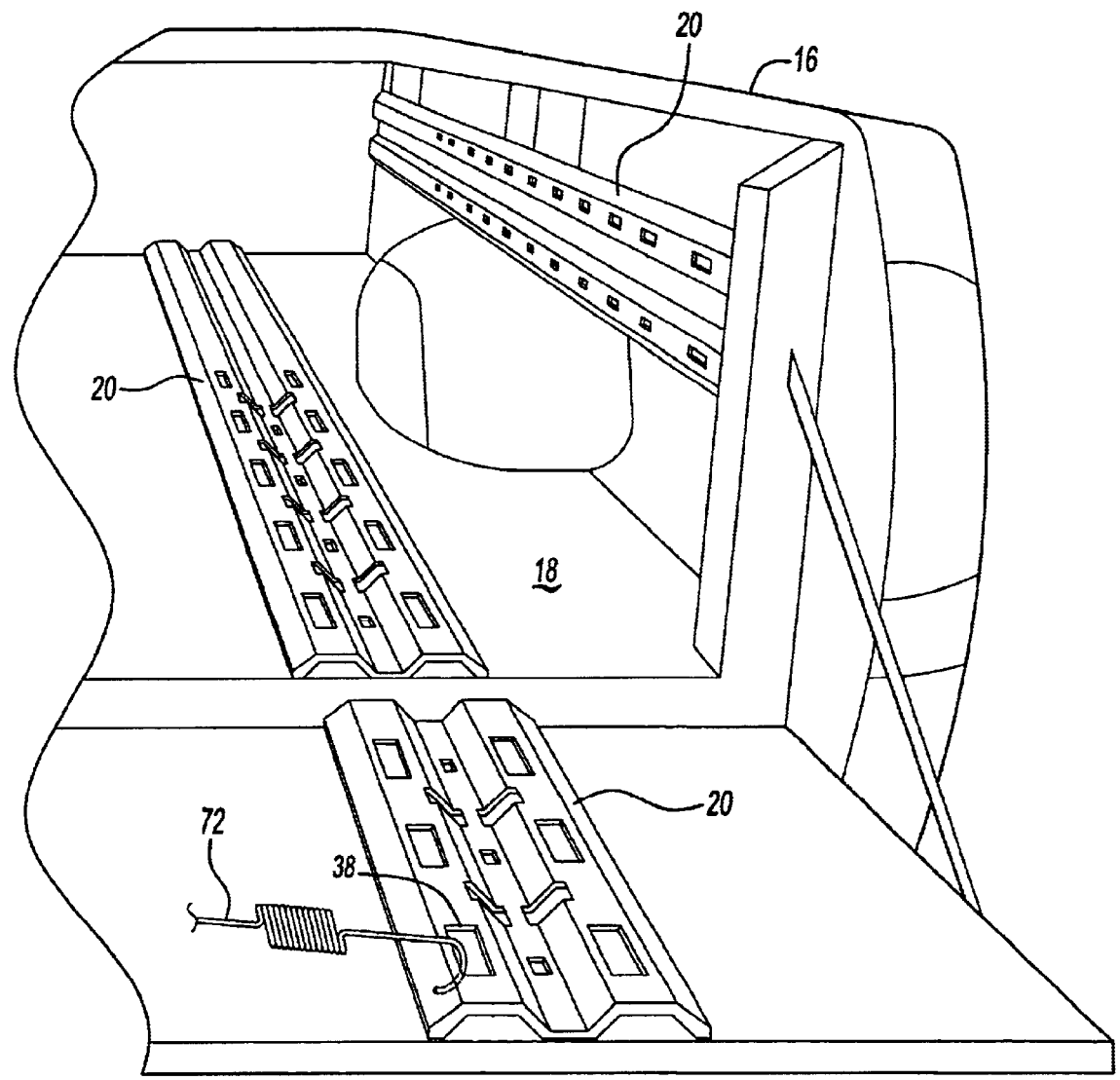
FIG. 11 is an enlarged perspective view illustrating a bungee cord tether attached to the tie down anchor system.
Figure 12:
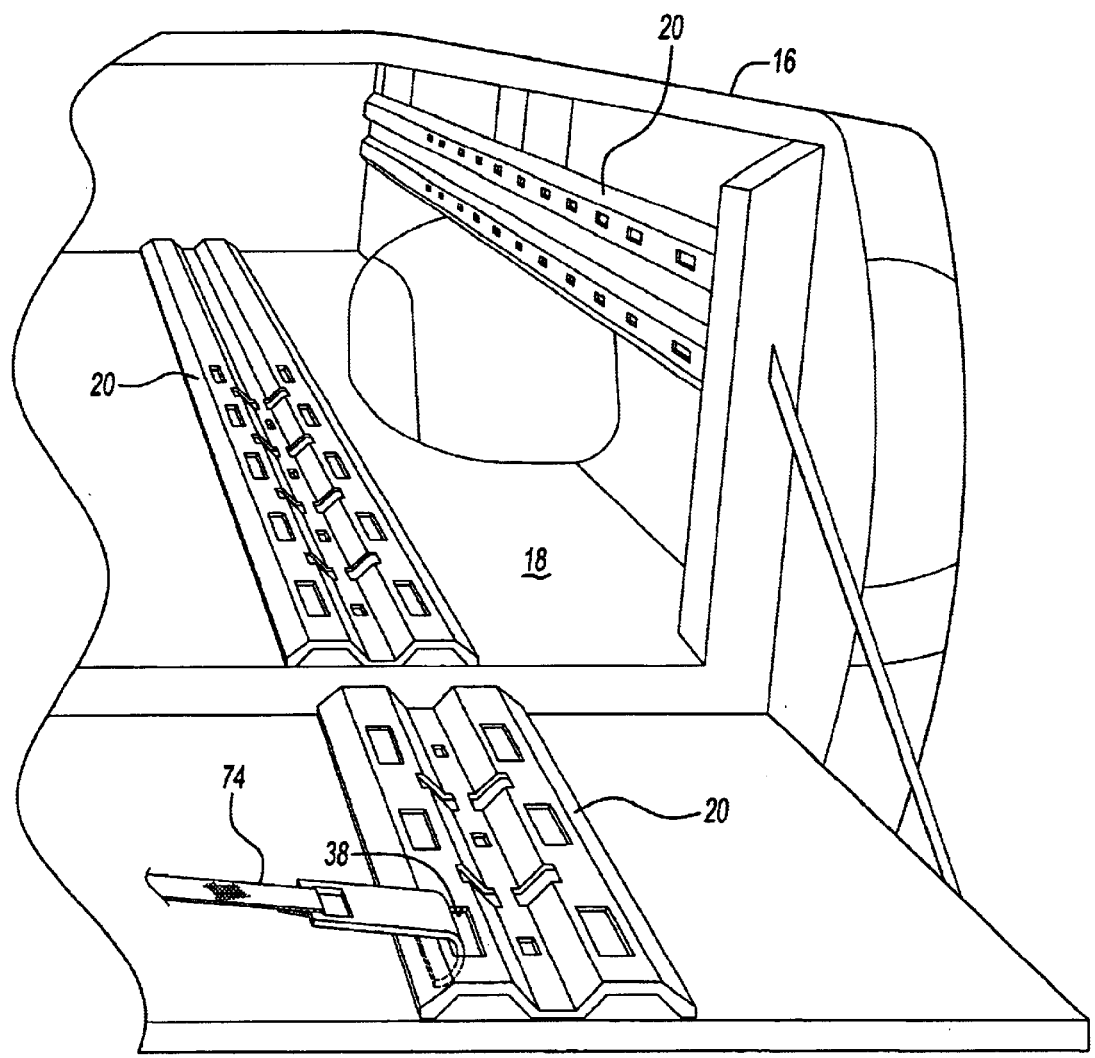
FIG. 12 is an enlarged perspective view illustrating a strap and metal stamped tether connector attached to the tie down anchor system.
Figure 13:
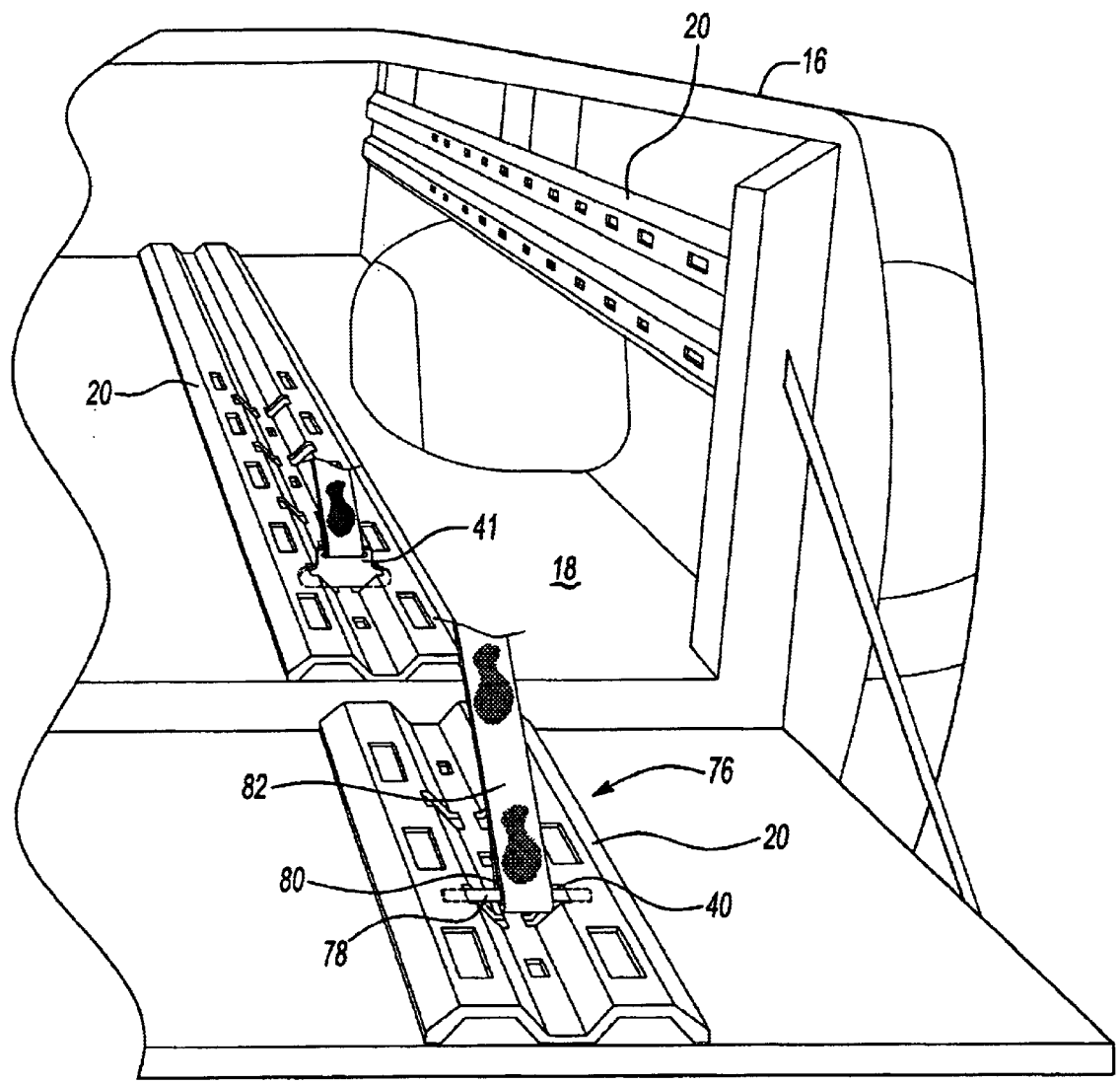
FIG. 13 is an enlarged perspective view illustrating a retaining rod connector attached to the tie down anchor system.

Still referring to FIG. 2, each of the pair of raised attachment portions 26 extends inwardly from foot portion 24 and is generally parallel to and offset from mounting surface 30. As will be described below, attachment portions 26 are offset from mounting surface 30 a distance A to accommodate a tether connector (FIGS. 11–13). Each of the pair of raised attachment portions 26 terminates at a pair of inboard inclined portions 34. The pair of inboard inclined portions 34 finally terminates into a base mounting portion 36. Base mounting portion 36 is adapted to generally rest upon and engage mounting surface 30. Therefore, base mounting portion 36 is generally parallel to mounting surface 30. It should be noted that the pair of inboard inclined portions 34 might be inclined at any angle $\alpha$ up to 90°. However, more preferably the pair of inboard inclined portions 34 are inclined at an angle in the range of about 30–75° from mounting surface 30 or base mounting portion 36 and, most preferably, at an angle of about 45° from mounting surface 30 or base mounting portion 36. Therefore, the pair of outboard inclined portions 22, the pair of raised attachment portions 26, and the pair of inboard inclined portions 34 cooperate to define a pair of raised attachment sections 35.

As seen in the figures, each of the plurality of rail members 20 generally includes a plurality of apertures formed therein. Specifically, with particular reference to FIGS. 2 and 3, each of the plurality of rail members 20 includes a plurality of first attachment apertures 38 formed in raised attachment portions 26. Although first attachment apertures 38 may have any shape that is conducive to a particular application, according to this first embodiment, first attachment apertures 38 are generally rectangular shaped and formed such that a longitudinal axis thereof is parallel to a longitudinal axis of rail members 20. It should be appreciated that first attachment aperture 38 is particularly adapted to receive any one of a number of tether connectors or support members therein.

Additionally, each of the plurality of rail members 20 further includes a plurality of second attachment apertures 40 formed in the plurality of inboard inclined portions 34. Although second attachment apertures 40 may have any shape that is conducive to a particular application, according to this first embodiment, second attachment apertures 40 are generally square shaped and are formed at a longitudinal position offset from first attachment apertures 38. Preferably, second attachment apertures 40 are formed at a position equidistant between alternating pairs of first attachment apertures 38. As can be seen in FIGS. 2 and 3, second attachment apertures 40 may extend beyond inboard inclined portions 34 and into raised attachment portions 26. Such extension may ease in the insertion of tether connectors into second attachment apertures 40.

Still further, each of the plurality of rail members 20 further includes a plurality of mounting apertures 42 formed in base mounting portion 36. The plurality of mounting apertures 42 are disposed along the length of rail members 20 and are adapted to receive a fastener 44 therethrough for fastening rail members 20 to mounting surface 30. Fastener 44 is preferably the bolts that are already used to attach cargo bed 14 to the frame of pickup truck 12, thus transferring load to the frame structure. In this regard, tie down anchor system 10 may be reliably and securely coupled to pickup truck 12 to retain the cargo.

Figure 14:
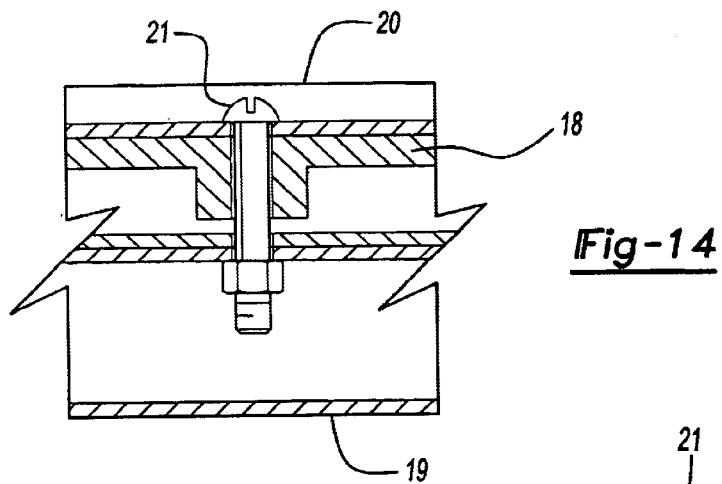
FIG. 14 is a front cross-sectional view illustrating the tie down anchor system being coupled to the frame of the pickup truck.
Figure 15:
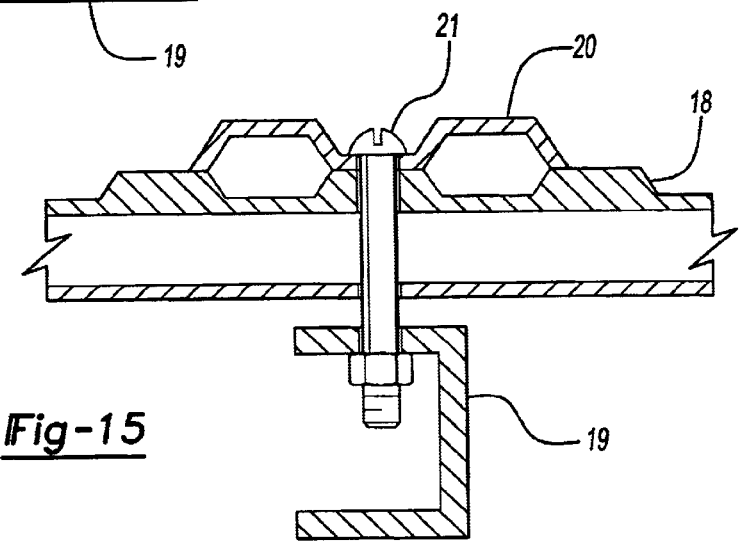
FIG. 15 is a side cross-sectional view illustrating the tie down anchor system being coupled to the frame of the pickup truck.

With particular reference to FIGS. 14 and 15, each of the plurality of rail members 20 may be coupled to pickup truck 12 according to any one of a number of fastening methods. However, by way of non-limiting example, it has been found that by coupling the plurality of rail members 20 to a frame member 19 of pickup truck 12, loads are more reliably and safely transferred to pickup truck 12. More particularly, with reference to FIGS. 14 and 15, a fastener 21, which may be the existing cargo bed fastener extending from cargo bed floor 18 to frame member 19, extends through rail member 20 and into frame member 19.

Figure 16:
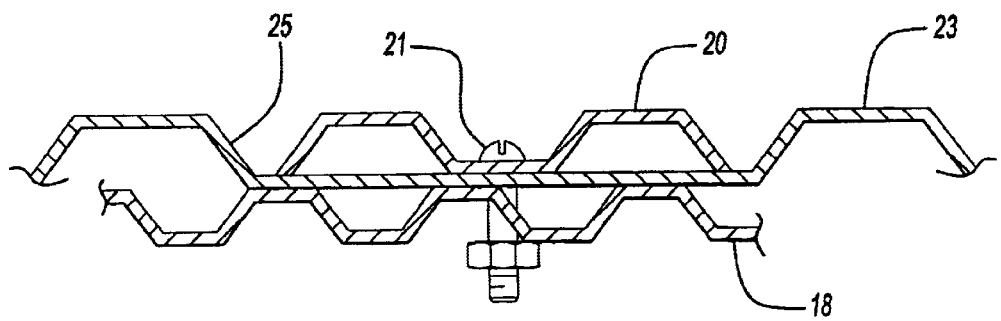
FIG. 16 is a cross-sectional view illustrating the tie down anchor system and bedliner being coupled to the pickup truck.

Additionally, as seen in FIG. 16, a bed liner 23 may be disposed within cargo bed 14 to further protect cargo bed 14. Preferably, bed liner 23 includes a pocket or other recess 25 formed therein to receive rail member 20 (see FIG. 16). Bed liner 23 is retained in position between rail member 20 and bed floor 18 via fastener 21.

As should be appreciated from the foregoing, rail members 20 may be cut to any desirable length so as to be easily customized for any size and/or shape of pickup truck cargo bed. Accordingly, it is preferable that the cross-sectional shape of rail members 20 remains constant.

Figure 4:
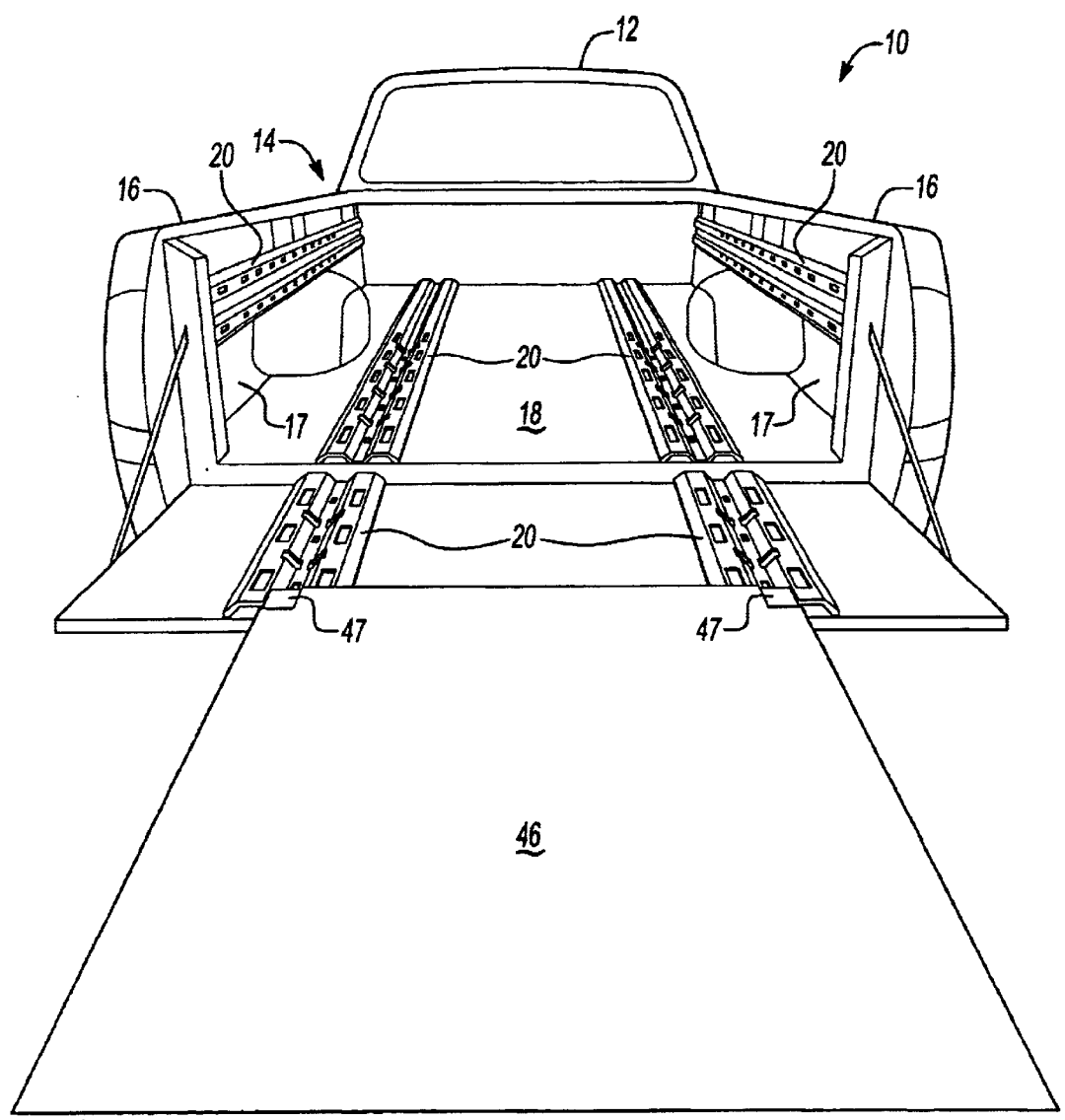
FIG. 4 is a perspective view illustrating the tie down anchor system having a ramp member mounted thereto.

Referring now to FIG. 4, it can be seen that each of the plurality of rail members 20 of tie down anchor system 10 may be mounted to cargo bed 14 at any one or all of a number of mounting positions. That is, according to the present embodiment, the plurality of rail members 20 may be mounted along the bed floor 18 and siderails 16 of cargo bed 14 such that the longitudinal axis of each of the plurality of rail members 20 is parallel to the longitudinal axis of pickup truck 12. The plurality of rail members 20 may be mounted to the frame rails of pickup truck 12 to provide for improved and reliable load transfer. Any number of rail members 20 may be mounted at each of the noted positions.

Still referring to FIG. 4, tie down anchor system 10 is adapted to receive a ramp member 46 having a pair of ramp tongues 47 disposed at opposing leading corners of ramp member 46. Ramp tongues 47 are configured so as to be received within first attachment apertures 38 or second attachment apertures 40. It is anticipated that ramp tongues 47 may include a locking mechanism to assure stability. Ramp member 46 is particularly useful for loading heavy equipment, such as motor vehicles and other wheeled items.

Figure 5:
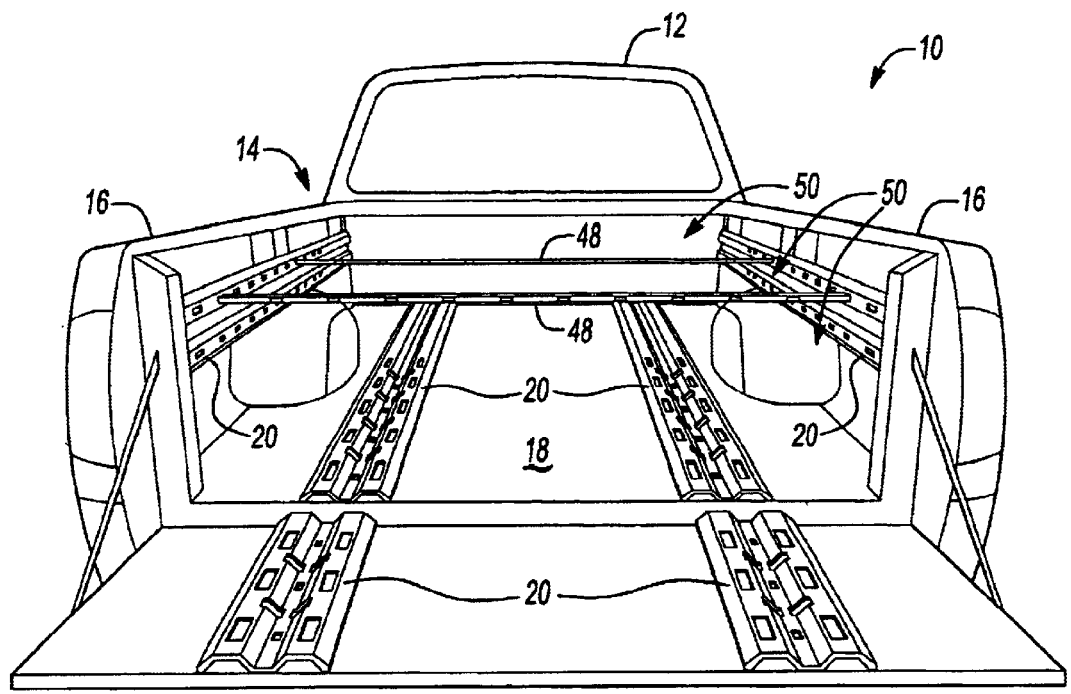
FIG. 5 is a perspective view illustrating the tie down anchor system having a pair of cross vehicle member mounted thereto.

Referring now to FIG. 5, tie down anchor system 10 is also adapted to receive a plurality of cross vehicle members 48. Each of the plurality of cross vehicle members 48 are sized so as to be received within first attachment apertures 38 or second attachment apertures 40. In this regard, the plurality of cross vehicle members 48 provide additional cargo reinforcement members and further define discrete cargo sections 50 of cargo bed 14 for separately supporting multiple cargo items. The plurality of cross vehicle members 48 may be made of any material, such as wood, metal, composites, and the like. Additionally, each of the plurality of cross vehicle members 48 may include a plurality of additional attachment apertures, similar to those described above, to aid in the anchoring of the cargo.

Figure 6:
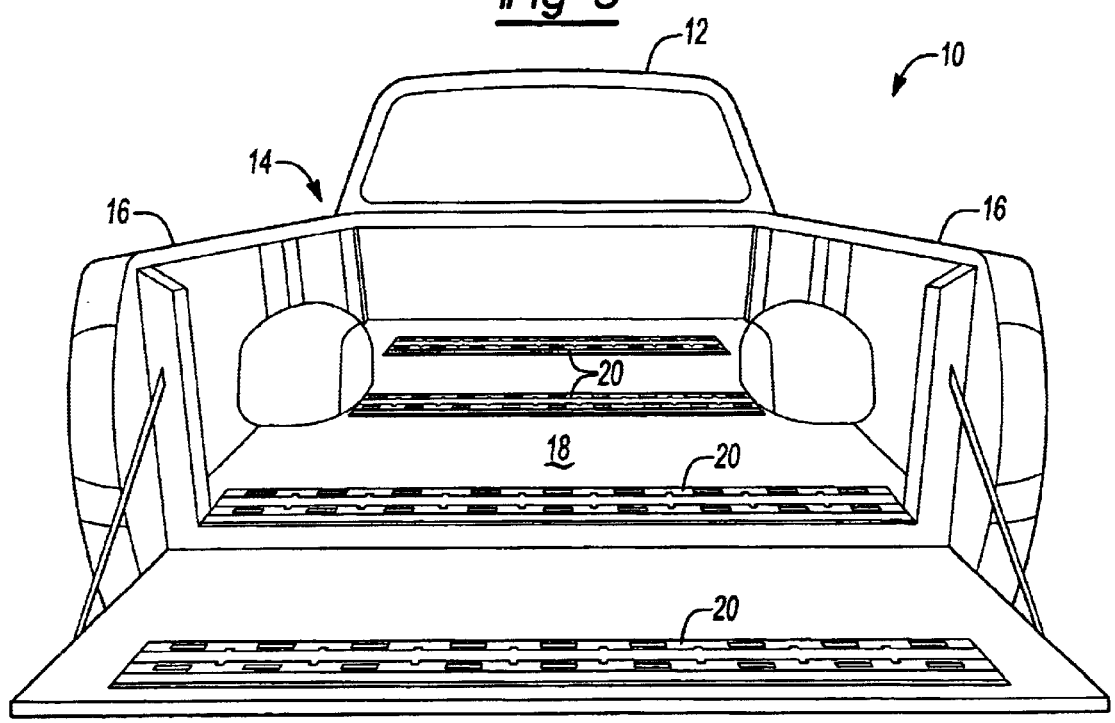
FIG. 6 is a perspective view illustrating the tie down anchor system according to the principles of the present invention incorporated in a cargo bed of a pickup truck in a cross vehicle direction.
Figure 7:
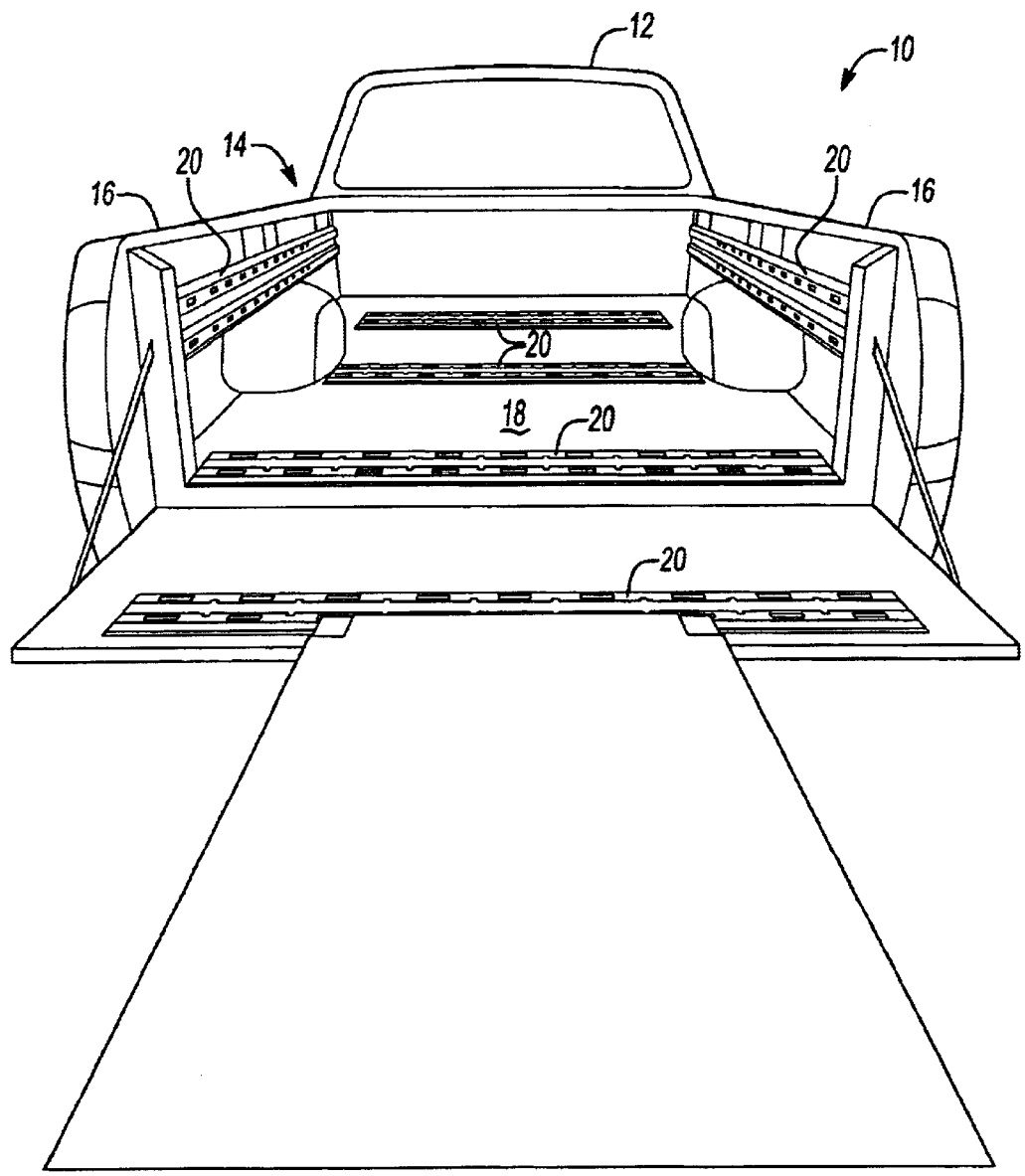
FIG. 7 is a perspective view illustrating the tie down anchor system of FIG. 6 having a ramp member mounted thereto.

As best seen in FIG. 6, the plurality of rail members 20 may also be mounted along bed floor 18 of cargo bed 14 such that the longitudinal axis of each of the plurality of rail members 20 is perpendicular to the longitudinal axis of pickup truck 12. Referring now to FIG. 7 and similarly as described above, a ramp member 46, having a pair of ramp tongues 47 disposed at opposing leading corners thereof, may be received within first attachment apertures 38 or second attachment apertures 40.

Figure 8A:
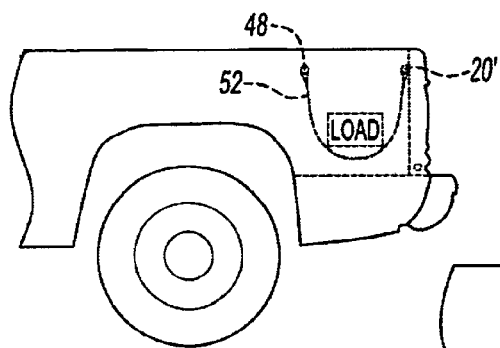
FIG. 8 is a partial cross-sectional view illustrating the tie down anchor system having a net retaining member mounted thereto.
Figure 8B:
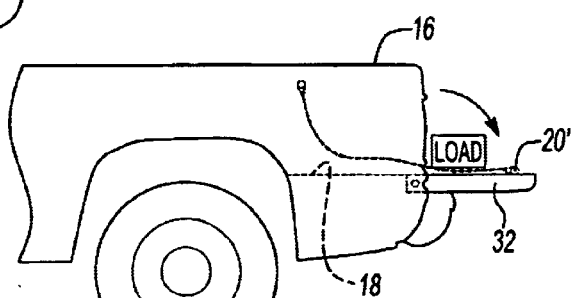
Figure 9:
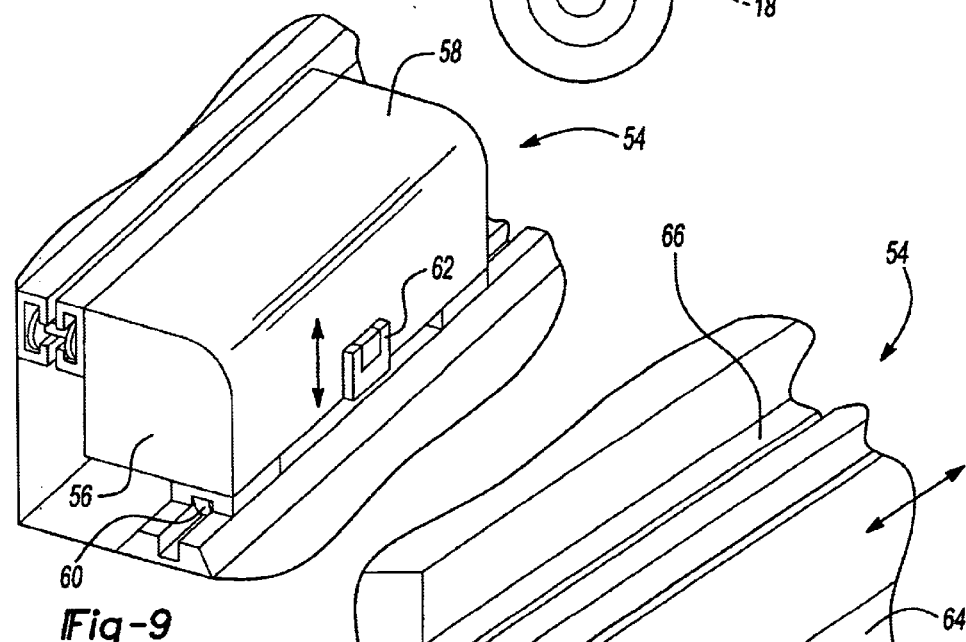
FIG. 9 is an enlarged perspective view illustrating the tie down anchor system supporting a first rolling container system.
Figure 10:
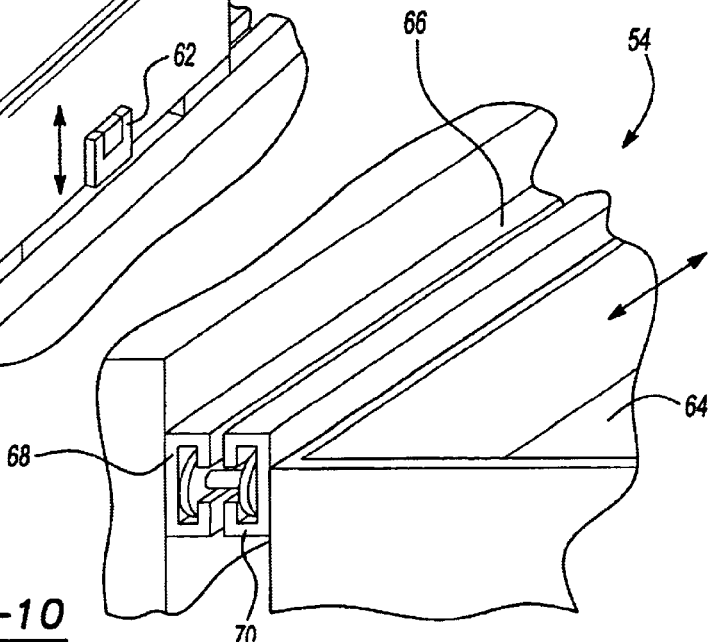
FIG. 10 is an enlarged perspective view illustrating the tie down anchor system supporting a second rolling container system.

Referring now to FIGS. 8–10, tie down anchor system 10 is particularly useful with a wide variety of storage and/or retaining devices. For instance, as seen in FIGS. 8(a) and (b), tie down anchor system 10 may be used with a net 52. Net 52 may be retained in a cross vehicle orientation to secure cargo therein. To this end, net 52 may be suspended along a cross vehicle member 48 at one end and coupled to rail member 20' at an opposing end. In this regard, the cargo is securely retained within cargo bed 14 when tailgate 32 is in a raised position (FIG. 8(a)) and easily accessible when tailgate 32 is in a lowered position (FIG. 8(b)).

Additionally, as seen in FIG. 9, tie down anchor system 10 may be used with a rolling container system 54. Rolling container system 54 generally includes a container 56 having a lid or other cover 58, wheels 60, and an optional rear retainer 62. Rolling container system 54 is particularly adapted for securely storing items within cargo bed 14. To access these items, container 56 may be rolled out from cargo bed 14 and on to tailgate 32. Specifically, wheels 60 are positioned so as to ride along base mounting portion 36. Rear retainer 62 engages rail member 20 disposed along siderails 16. However, it should be appreciated that rolling container system 54 may be oriented in a cross vehicle position such that wheels 60 engage at least a pair of rail members 20. Furthermore, as seen in FIG. 10, rolling container system 54 could include a drawer-like compartment 64, wherein a pair of sliding mechanism 66 each includes a first member 68 fixedly attached to rail member 20 disposed along siderail 16 and a second member 70 fixedly attached to drawer-like compartment 64. First member 68 slidably engages second member 70 to enable sliding movement of drawer-like compartment 64 relative to bed floor 18.

As best seen in FIGS. 11–13, tie down anchor system 10 may be used with a wide variety of tie downs and/or tether connectors. For example, tie down anchor system 10 may be used with standard bungee cord hook type tether connectors 72 (FIG. 11), strap and metal stamped tether connectors 74 (FIG. 12), and may be used with retaining rod connectors 76 (FIG. 13). Retaining rod connectors 76 includes a retaining rod 78 extending through a hoop 80 formed in a tether strap 82. Retaining rod 78 may then be slipped within opposing second attachment apertures 40 such that retaining rod 78 engages an underside of raised attachment portions 26 of rail member 20. As can be appreciated, offset A (FIG. 2) enables any tether connector to be easily coupled to rail member 20. Additionally, tie down anchor system 10 may be used with a conventional D-ring locking mechanism 41, which is available from MCMASTER CARR.

Therefore, according to the principles of the present invention, a tie down anchor system is provided for pickup trucks that is capable of eliminating or at least minimizing bending loads applied to the siderails of the pickup bed. Furthermore, the tie down anchor system of the present invention is capable of providing robust connection to either a siderail, side wall, frame through the bed floor and/or bed floor of a pickup bed. Additionally, the tie down anchor system of the present invention is capable of accommodating a wide number of different tether connectors depending upon the cargo to be retained.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tie down anchor system for a pickup truck, said pickup truck having a pair of siderails and a floor defining a cargo bed, said tie down anchor system comprising:
   a first rail member mountable to the cargo bed of the pickup truck, said first rail member having:
      a pair of outboard inclined portions;
      a pair of raised attachment portions each extending from each of said pair of outboard inclined portions;
      a pair of inboard inclined portions each extending downwardly from each of said pair of raised attachment portions;
      a base mounting portion extending between said pair of inboard inclined portions;
      a plurality of first attachment apertures formed in said pair of raised attachment portions; and
      a plurality of second attachment apertures formed in said pair of inboard inclined portions.

2. The tie down anchor system according to claim 1, further comprising:
   a plurality of mounting apertures formed in said base mounting portion.

3. The tie down anchor system according to claim 1, further comprising:
   an enlarged foot portion extending along a lower edge of each of said pair of outboard inclined portions, said enlarged foot portion being engagable with the cargo bed.

4. The tie down anchor system according to claim 1 wherein said inboard inclined portions are inclined in the range of about 30° to about 75° relative to said base mounting portion.

5. The tie down anchor system according to claim 1 wherein said inboard inclined portions are inclined about 45° relative to said base mounting portion.

6. The tie down anchor system according to claim 1 wherein said first rail member defines a longitudinal axis, said first rail member being mountable to the cargo bed such that said longitudinal axis of said first rail member is parallel to a longitudinal axis of the cargo bed.

7. The tie down anchor system according to claim 1 wherein said first rail member defines a longitudinal axis, said first rail member being mountable to the cargo bed such that said longitudinal axis of said first rail member is perpendicular to a longitudinal axis of the cargo bed.

8. The tie down anchor system according to claim 1, further comprising:
 a first tether connector engaging at least one of said plurality of first attachment apertures; and
 a second tether connector engaging at least one of said plurality of second attachment apertures, the shape of said second tether connector being different than the shape of said first tether connector.

9. The tie down anchor system according to claim 1, further comprising:
 a second rail member being identical to said first rail member; and
 a support member extending between and engaging said first rail member and said second rail member.

10. The tie down anchor system according to claim 9, further comprising:
 a net member being retained by said first rail member and said second rail member, said net member being operable to retain cargo.

11. The tie down anchor system according to claim 1, further comprising:
 a container system movably mounted to said first rail member, said container system having:
  a container; and
  at least one wheel mounted to said container, said at least one wheel engaging said first rail member.

12. The tie down anchor system according to claim 1, further comprising:
 a container system movably mounted to said first rail member, said container system having:
  a container; and
  a sliding mechanism slidably coupling said container to said first rail member.

13. The tie down anchor system according to claim 1 wherein said first rail member is mountable over a bed liner to the cargo bed of the pickup truck.

14. The tie down anchor system according to claim 1 wherein said first rail member is mountable to a frame structure of the cargo bed of the pickup truck.

15. A tie down anchor system for a pickup truck, said pickup truck having a pair of siderails and a floor defining a cargo bed, said tie down anchor system comprising:
 a first rail member mountable to the cargo bed of the pickup truck, said first rail member includes a generally M-shaped cross section, said first rail member having:
  a pair of raised attachment sections;
  a base mounting portion extending between sail pair of raised attachment sections;
  a plurality of first attachment apertures formed in said pair of raised attachment sections; and
  a plurality of second attachment apertures formed in said pair of raised attachment sections.

16. The tie down anchor system according to claim 15 wherein each of said pair of raised attachment sections comprises:
 a pair of outboard inclined portions;
 a pair of raised attachment portions each extending from each of said pair of outboard inclined portions;
 a pair of inboard inclined portions each extending downwardly from each of said pair of raised attachment portions.

17. The tie down anchor system according to claim 16 wherein said inboard inclined portions are inclined in the range of about 30° to about 75° relative to said base mounting portion.

18. The tie down anchor system according to claim 16 wherein said inboard inclined portions are inclined about 45° relative to said base mounting portion.

19. The tie down anchor system according to claim 15, further comprising:
 a plurality of mounting apertures formed in said base mounting portion.

20. The tie down anchor system according to claim 15 wherein said first rail member defines a longitudinal axis, said first rail member being mountable to the cargo bed such that said longitudinal axis of said first rail member is parallel to a longitudinal axis of the cargo bed.

21. The tie down anchor system according to claim 15 wherein said first rail member defines a longitudinal axis, said first rail member being mountable to the cargo bed such that said longitudinal axis of said first rail member is perpendicular to a longitudinal axis of the cargo bed.

22. The tie down anchor system according to claim 15, further comprising:
 a second rail member being identical to said first rail member; and
 a support member extending between and engaging said first rail member and said second rail member.

23. The tie down anchor system according to claim 22, further comprising:
 a net member being retained by said first rail member and said second rail member, said net member being operable to retain cargo.

24. The tie down anchor system according to claim 15, further comprising:
 a container system movably mounted to said first rail member, said container system having:
  a container; and
  a sliding mechanism slidably coupling said container to said first rail member.

25. A tie down anchor system for pickup truck, said pickup truck having a pair of siderails and a floor defining a cargo bed, said tie down anchor system comprising:
 a first rail member mountable to the cargo bed of the pickup truck, said first rail member having:
  a pair of raised attachment sections;
  a base mounting portion extending between said pair of raised attachment sections;
  a plurality of first attachment apertures formed in said pair of raised attachment sections; and
  a plurality of second attachment apertures formed in said pair of raised attachment sections;
 a first tether connector engaging at least one of said plurality of first attachment apertures; and
 a second tether connector engaging at least one of said plurality of second attachment apertures, the shape of said second tether connector being different than the shape of said first tether connector.

26. A tie down anchor system for a pickup truck, said pickup truck having a pair of siderails and a floor defining a cargo bed, said tie down anchor system comprising:

a first rail member mountable to the cargo bed of the pickup truck, said first rail member having:
   a pair of raised attachment sections;
   a base mounting portion extending between said pair of raised attachment sections;
   a plurality of first attachment apertures formed in said pair of raised attachment sections; and
   a plurality of second attachment apertures formed in said pair of raised attachment sections;
a container system movably mounted to said first rail member, said container system having:
   a container; and
   at least one wheel mounted to said container, said at least one wheel engaging said first rail member.

27. A tie down anchor system for a pickup truck, said pickup truck having a pair of siderails and a floor defining a cargo bed, said tie down anchor system comprising:
   a generally M-shaped first rail member mountable to the cargo bed of the pickup truck, said first rail member having:
      a pair of outboard inclined portions;
      a pair of raised attachment portions each extending from each of said pair of outboard inclined portions;
      a pair of inboard inclined portions each extending downwardly from each of said pair of raised attachment portions;
      a base mounting portion extending between said pair of inboard inclined portions;
      a plurality of first attachment apertures formed in said pair of raised attachment portions; and
      a plurality of second attachment apertures formed in said pair of inboard inclined portions;
   wherein said inboard inclined portions are inclined in the range of about 30° to about 75° relative to said base mounting portion.

28. The tie down anchor system according to claim 27 wherein said inboard inclined portions are inclined about 45° relative to said base mounting portion.

29. The tie down anchor system according to claim 27 wherein said first rail member defines a longitudinal axis, said first rail member being mountable to the cargo bed such that said longitudinal axis of said first rail member is parallel to a longitudinal axis of the cargo bed.

30. The tie down anchor system according to claim 27 wherein said first rail member defines a longitudinal axis, said first rail member being mountable to the cargo bed such that said longitudinal axis of said first rail member is perpendicular to a longitudinal axis of the cargo bed.

31. The tie down anchor system according to claim 27, further comprising:
   a first tether connector engaging at least one of said plurality of first attachment apertures; and
   a second tether connector engaging at least one of said plurality of second attachment apertures, the shape of said second tether connector being different than the shape of said first tether connector.

32. The tie down anchor system according to claim 27, further comprising:
   a second rail member being identical to said first rail member; and
   a support member extending between and engaging said first rail member and said second rail member.

33. The tie down anchor system according to claim 32, further comprising:
   a net member being retained by said first rail member and said second rail member, said net member being operable to retain cargo.

34. The tie down anchor system according to claim 27, further comprising:
   a container system movably mounted to said first rail member, said container system having:
      a container; and
      at least one wheel mounted to said container, said at least one wheel engaging said first rail member.

35. The tie down anchor system according to claim 27, further comprising:
   a container system movably mounted to said first rail member, said container system having:
      a container; and
      a sliding mechanism slidably coupling said container to said first rail member.

36. A pickup truck comprising:
   a frame;
   a cargo bed having at least pair of side walls and a floor;
   a first rail member having:
      a pair of raised attachment sections;
      a base mounting portion extending between said pair of raised attachment sections;
      a plurality of first attachment apertures formed in said pair of raised attachment sections; and
      a plurality of second attachment apertures formed in said pair of raised attachment sections;
   at least one fastener coupling said cargo bed and said first rail member to said frame; and
   a bed liner coupled between said first rail member and said cargo bed.

37. A pickup truck comprising:
   a frame;
   a cargo bed having at least pair of side walls and a floor;
   a first rail member having:
      a pair of raised attachment sections;
      a base mounting portion extending between said pair of raised attachment sections;
      a plurality of first attachment apertures formed in said pair of raised attachment sections; and
      a plurality of second attachment apertures formed in said pair of raised attachment sections; and
   at least one fastener coupling said cargo bed and said first rail member to said frame,
   wherein each of said pair of raised attachment sections comprises:
   a pair of outboard inclined portions;
   a pair of raised attachment portions each extending from each of said pair of outboard inclined portions; and
   a pair of inboard inclined portions each extending downwardly from each of said pair of raised attachment portions.

38. The pickup truck according to claim 37 wherein said inboard inclined portions are inclined in the range of about 30° to about 75° relative to said base mounting portion.

39. The pickup truck according to claim 37 wherein said inboard inclined portions are inclined about 45° relative to said base mounting portion.

40. A pickup truck comprising:
   a frame;
   a cargo bed having at least pair of side walls and a floor;
   a first rail member having:
      a pair of raised attachment sections;
      a base mounting portion extending between said pair of raised attachment sections;
      a plurality of first attachment apertures formed in said pair of raised attachment sections; and a plurality of second attachment apertures formed in said pair of raised attachment sections; and at least one fastener coupling said cargo bed and said first rail member to said frame, wherein said first rail member includes a generally M-shaped cross section.

41. The pickup truck according to claim 40 wherein said first rail member defines a longitudinal axis, said first rail member being mounted to said cargo bed such that said longitudinal axis of said first rail member is parallel to a longitudinal axis of said cargo bed.

42. The pickup truck according to claim 40 wherein said first rail member defines a longitudinal axis, said first rail member being mounted to said cargo bed such that said longitudinal axis of said first rail member is perpendicular to a longitudinal axis of said cargo bed.

43. A pickup truck comprising:

a frame;

a cargo bed having at least pair of side walls and a floor;

a first rail member having:
   a pair of raised attachment sections;
   a base mounting portion extending between said pair of raised attachment sections;
   a plurality of first attachment apertures formed in said pair of raised attachment sections; and
   a plurality of second attachment apertures formed in said pair of raised attachment sections; and at least one fastener coupling said cargo bed and said first rail member to said frame;

a first tether connector engaging at least one of said plurality of first attachment apertures; and a second tether connector engaging at least one of said plurality of second attachment apertures, the shape of said second tether connector being different than the shape of said first tether connector.

44. A pickup truck comprising:

a frame;

a cargo bed having at least pair of side walls and a floor;

a first rail member having:
   a pair of raised attachment sections;
   a base mounting portion extending between said pair of raised attachment sections;
   a plurality of first attachment apertures formed in said pair of raised attachment sections; and
   a plurality of second attachment apertures formed in said pair of raised attachment sections; and at least one fastener coupling said cargo bed and said first rail member to said frame;

a second rail member being identical to said first rail member;

a support member extending between and engaging said first rail member and said second rail member; and a net member being retained by said first rail member and said second rail member, said net member being operable to retain cargo.

45. A pickup truck comprising:

a frame;

a cargo bed having at least pair of side walls and a floor;

a first rail member having:
   a pair of raised attachment sections;
   a base mounting portion extending between said pair of raised attachment sections;
   a plurality of first attachment apertures formed in said pair of raised attachment sections; and
   a plurality of second attachment apertures formed in said pair of raised attachment sections; and at least one fastener coupling said cargo bed and said first rail member to said frame;

a container system movably mounted to said first rail member, said container system having:
   a container; and
   at least one wheel mounted to said container, said at least one wheel engaging said first rail member.

46. A pickup truck comprising:

a frame;

a cargo bed having at least pair of side walls and a floor;

a first rail member having:
   a pair of raised attachment sections;
   a base mounting portion extending between said pair of raised attachment sections;
   a plurality of first attachment apertures formed in said pair of raised attachment sections; and
   a plurality of second attachment apertures formed in said pair of raised attachment sections; and at least one fastener coupling said cargo bed and said first rail member to said frame;

a container system movably mounted to said first rail member, said container system having:
   a container; and a sliding mechanism slidably coupling said container to said first rail member.

* * * * *

UNITED STATES PATENT AND TRADEMARK OFFICE
CERTIFICATE OF CORRECTION

PATENT NO.        : 6,799,927 B2
APPLICATION NO. : 10/215749
DATED             : October 5, 2004
INVENTOR(S)       : Donald G. Wheatley It is certified that error appears in the above-identified patent and that said Letters Patent is hereby corrected as shown below:

Column 2, line 59, "member" should be --members--.

Column 7, line 62, "sail" should be --said--.

Column 10, line 17, claim 36, after "least" insert --a--.

Column 10, line 33, claim 37, after "least" insert --a--.

Column 10, line 61, claim 40, after "least" insert --a--.

Column 11, line 19, claim 43, after "least" insert --a--.

Column 11, line 39, claim 44, after "least" insert --a--.

Column 12, line 13, claim 45, after "least" insert --a--.

Column 12, line 31, claim 46, after "least" insert --a--.

Signed and Sealed this

Second Day of January, 2007

JON W. DUDAS
*Director of the United States Patent and Trademark Office*